(12) United States Patent
Fukuda et al.

(10) Patent No.: US 6,197,446 B1
(45) Date of Patent: Mar. 6, 2001

(54) INTEGRATED ENCLOSED SECONDARY BATTERY

(75) Inventors: Shinsuke Fukuda; Mitsugu Takaki, both of Toyohashi; Kenji Sato, Osaka; Rye Iwamura, Toyohashi; Toshinobu Yokoyama, Hirakata, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/331,027

(22) PCT Filed: Oct. 19, 1998

(86) PCT No.: PCT/JP98/04723

§ 371 Date: Jun. 15, 1999

§ 102(e) Date: Jun. 15, 1999

(87) PCT Pub. No.: WO99/21237

PCT Pub. Date: Apr. 29, 1999

(30) Foreign Application Priority Data

Oct. 20, 1997 (JP) .................................................. 9-287305

(51) Int. Cl.⁷ .................................................. H01M 2/00
(52) U.S. Cl. .......................... 429/163; 429/175; 429/148; 429/149; 429/153; 429/154; 429/160; 429/161; 429/167; 429/177; 429/186; 429/142

(58) Field of Search ..................................... 429/160, 161, 429/162, 163, 167, 177, 186, 142, 148, 149, 153, 154, 225, 175

(56) References Cited

FOREIGN PATENT DOCUMENTS

| 49-124518 | 10/1974 | (JP) . |
| 52-51035 | 4/1977 | (JP) . |
| 7-85847 | 3/1995 | (JP) . |
| 7-235326 | 9/1995 | (JP) . |

*Primary Examiner*—Stephen Kalafut
*Assistant Examiner*—Angela J. Martin
(74) *Attorney, Agent, or Firm*—Jordan and Hamburg LLP

(57) ABSTRACT

A sealed secondary battery assembly in which electricity-generating elements are accommodated in cases made of resin formed in rectangular tubular shape having a bottom, a plurality of cells constituted by sealing the apertures of cases by covers made of resin are arranged in series, these being electrically connected by electrical connection elements, wherein: the cases of the individual cells are constituted by a unitary case and the covers of the individual cells are constituted by a unitary cover, support elements made of resin in which are fixed electrical connection elements are joined to support element mounting passage sections provided on partition sections that define the space for the cells, said electrical connection elements being thereby arranged so as to pass through said partition sections.

18 Claims, 10 Drawing Sheets

INTEGRATED ENCLOSED SECONDARY BATTERY

DESCRIPTION

1. Technical Field

The present invention relates to a sealed secondary battery assembly employed for nickel-hydrogen secondary batteries or the like constituting the drive power source for an electric vehicle.

2. Background Art

Sealed secondary battery assemblies of this type are previously known and are disclosed in Laid-Open Japanese Patent Publication No.7-85847. This prior art example has a construction as shown in FIG. 16. Specifically, electricity generating elements are accommodated in battery cases 36 made of resin formed in rectangular tubular shape having a bottom, the apertures of these battery cases 36 are sealed by covers 37 made of resin to constitute cells 32, a plurality of which are arranged in series, the battery cases 36 of these cells 32 being connected in tightly restrained condition by means of end plates 35 and restraining straps 34. Also, pillar-shaped positive electrode terminals 38 and negative electrode terminals 39 of the cells 32 penetrate through covers 37 and project above them, these terminals 38 and 39 being electrically connected by means of an electrical connection bar 40.

Positive electrode terminal 38 and negative electrode terminal 39 must be mounted on cover 37 in a condition in which sealing is guaranteed. A known mounting construction is shown in FIG. 17. These terminals 38 and 39 are referred to as terminal post 41. This terminal post 41 comprises: a pillar body 43 that passes through a hole 42 provided in the upper wall of cover 37, a flange 45 that makes pressure contact through an O-ring 44 with the undersurface of the upper wall of cover 37, and a threaded part 47 for fixing an electrical connection bar 40 by securing a nut 46 by screwing nut 46 on to the top of pillar body 43. Terminal post 41 is mounted on cover 37 by means of an annular compression spring 48.

However, if a construction as in the prior art example is adopted in which the positive electrode and negative electrode terminals 38 and 39 i.e. terminal posts 41 project above cover 37, these being electrically connected by an electrical connection bar 40, the height of the secondary battery is increased by the amount that terminal posts 41 project above cover 37, which is contrary to demands for compactness. Also, sealing must be effected separately between terminal post 41 and cover 37, and if the sealing is insufficient there is the problem that liquid or gas can directly leak to the outside. Another problem was that the current path: terminal post 41, electrical connection bar 40, terminal post 41 was long.

A further problem was that, since, as shown in FIG. 17, the electrical connection construction and the terminal post mounting construction were complicated, the number of components was large, resulting in high costs.

The fact that the electrical connection construction and terminal post mounting construction are complicated i.e. that their sealing structure is itself complicated means that sealing strength is difficult to ensure. Needless to say, in order to achieve high sealing performance, the construction of the locations that require sealing should preferably be simple.

An object of the present invention is to solve the problems described above and to provide a sealed secondary battery assembly of excellent sealing construction around the electrical connection elements.

DISCLOSURE OF THE INVENTION

In order to achieve the above objects, the present invention provides a sealed secondary battery assembly in which electricity-generating elements are accommodated in cases made of resin formed in rectangular tubular shape having a bottom, a plurality of cells constituted by sealing apertures of the cases by covers made of resin are arranged in series, these cells being electrically connected by electrical connection elements, characterized in that the cases of the individual cells are integrally coupled and the covers of the individual cells are constituted by a unitary cover, support elements made of resin in which are fixed electrical connection elements are joined to support element mounting passage sections provided on partition sections that define the space for the cells, said electrical connection elements being thereby arranged so as to pass through said partition sections.

With the above construction, since an internally connected structure is constituted by the electrical connection elements passing through the partition sections that partition the individual cells, the height of the battery can be made lower than in the case of the prior art, enabling the secondary battery to be made more compact. Furthermore, owing to the adoption of the internally connected construction, a sealing structure between these and the covers is unnecessary, unlike in the prior art example. Furthermore, this is advantageous in point of view of safety in that even if sealing were to be insufficient around the electrical connection elements, leakage of liquid or direct discharge of gas to the outside cannot occur.

Also, with the above construction, since the electrical connection elements are arranged so as to pass through the partition sections by joining the resin support elements in which the electrical connection elements are fixed to support element mounting passage sections provided in said partition sections, the sealing between the electrical connection elements and support elements can be performed independently at the outside. As a result, sealing around the electrical connection elements can be performed in a reliable manner. Also, the sealing between the support elements and the partition sections can easily be performed in a reliable manner, since both of these are constituted of resin, thereby enabling a sealed secondary battery assembly to be provided which has an excellent sealing structure around the electrical connection elements. Also, since the electrical connection elements can be connected by a current path of shortest distance between the individual cells, the resistance between the individual cells can be reduced. Also, since most of the sealing structure: terminal post, nut, electrical connection bar and annular compression spring which was necessary in the prior art example can be dispensed with, reduction in costs can be achieved. Since the construction is simpler and more convenient than in the prior art example, better sealing characteristics can be achieved.

In the present invention, a construction may be adopted wherein the cases of the individual cells are separately manufactured, and these are restrained using end plates and restraining straps, thereby coupling these cases in unitary fashion. Also, a unitary case could be produced by joining these cases. Alternatively, a unitary case could be produced consisting of a unitary molding. Also, the unitary cover could be constructed by manufacturing covers for the individual cells separately, and joining up these covers. However, from the point of view of ease of manufacture (since a unitary cover is of small thickness, even though it has a large area, it is well suited to a unitary resin molding), strength, and rigidity, construction in the form of a unitary molding is ideal.

According to the invention, if a construction is adopted wherein a support element mounting passage section is constituted by forming a recess in the upper side of the partition sections of the unitary case, the support element being formed in a shape that fits into this recess, so that the two are joined in a condition with the support element fitted into the support element mounting passage unit, the two may be joined up in a manner requiring little labor using means such as welding or adhesion by fitting the support body in which the electrical connection element is fixed from above into the recess (support element mounting passage section) provided in the upper side of the partition section. If the cases of the individual cells are manufactured separately and these cases are either coupled by restraining or joined up to constitute a unitary case, the two may be joined by forming respective recesses of the upper side of the joining walls of the cases of the individual cells so that these constitute support element mounting passage sections of the partition sections, forming support elements in a shape whereby they can be fitted in spanning two adjacent recesses, in a condition in which the support elements are fitted into the support element mounting passage sections.

If according to the invention the upper side of the support element and upper side of the partition section of the cases are constituted in a coplanar condition, the operation of fixing the cases and unitary cover can be performed smoothly.

If according to the invention the cases, unitary cover and support elements are constituted of the same type of resin, the three can easily be joined, and in particular joining by welding is easy and reliable.

According to the invention, if a construction is adopted wherein the electric connection element consists of a metallic rod and the support element has a through-hole for pressing in the metallic rod, the metallic rod being fixed in the support element by pressing the metallic rod into the support element while applying to the metallic rod, if necessary, ultrasonic vibration, heating or both of these, the sealing construction in regard to the support element around the electrical connection element (metallic rod) can be made reliable. In particular, if, when the metallic rod is pressed into the through-hole of the support element, ultrasonic vibration, heating or both of these is applied to the metallic rod, the resin around the through-holes of the support element undergoes slight melting followed by solidification, thereby achieving a sealing action, and the support element is fixed in a condition with the metallic rod clamped in the pressed-in condition around its circumference, so the sealing construction between the metallic rod and through-hole can be made reliable.

According to the invention, if a circumferential groove is provided in the metallic rod and, when the metallic rod is pressed into the through-hole of the support element, some of the resin of the support element is melted out into this groove by applying ultrasonic vibration, heating or both of these, followed by solidification, movement of the metallic rod in the axial direction is restrained by means of the resin that has melted out and solidified in the groove of the metallic rod, thereby enabling reliable fixing of the metallic rod into the support element to be achieved.

According to the invention, if a construction is adopted whereby a circumferential holding groove is provided in the internal face of the through-hole of the support element and an O-ring pressed against the circumference of the metallic rod is held in this holding groove and furthermore a construction is adopted in which soft sticky sealant is applied to the holding groove, sealing between the electrical connection element (metallic rod) and support element can be further improved. In particular, although there might be a risk that, since heat is generated when the battery is used the through-hole of the resin support element, which is of larger thermal expansion coefficient than the metal, would expand, creating a gap between it and the metallic rod, sealing can be ensured by the action of the O-ring etc.

According to the invention, apart from the electrical connection element being a single member of nickel, it could be constructed of a composite material such as Fe—Ni, Cu—Ni, Cu—SUS, or Cu—Ag etc., or could be constructed of a single metallic member other than nickel.

According to the invention, a construction could be adopted in which a support element mounting passage section is constituted by forming a recess in the underside of the partition section of the unitary cover, and the support element is formed in a shape fitting into this recess, thereby joining the two in a condition with the support element fitted into the support element mounting passage section.

If according to the invention a construction is adopted wherein the electrical connection element is a metallic rod and the metallic rod is coupled to the support element by insert molding, an electrical connection element with attached support element can be provided that is well suited to mass production.

BEST MODE FOR CARRYING OUT THE INVENTION

Figure 1:
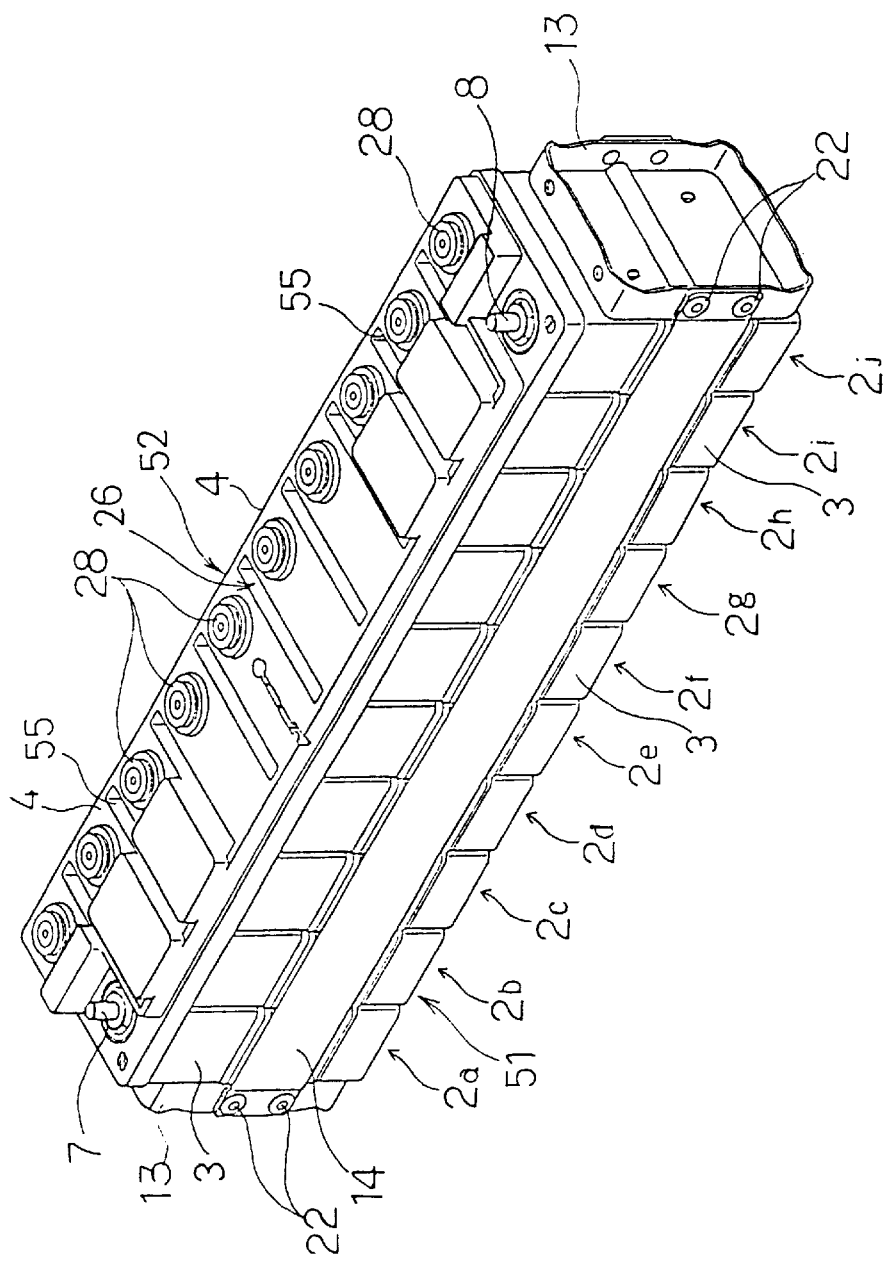
FIG. 1 is a perspective view showing the whole of an embodiment of the present invention.

An embodiment of the present invention is described below with reference to the drawings.

This embodiment relates to a nickel/hydrogen secondary battery assembly developed as a drive power source for an electric vehicle. In this secondary battery, as shown in FIG. 1 to FIG. 6, electricity-generating elements 1 are accommodated in battery cases 3 made of resin formed in the shape of rectangular tubes having a bottom; ten cells 2a to 2j constituted by sealing the apertures of battery cases 3 by means of covers 4 made of resin are arranged in a row, and these are electrically connected in series.

The battery cases 3 of the cells 2a to 2j are mutually connected using welding means, thereby constituting a unitary battery case 51.

Covers 4 are constituted by a unitary cover 52 consisting of a unitary resin molding whose internal space is divided into independent cells 2a to 2j by means of partition sections 53 (see FIG. 6) provided on this unitary cover 52.

When battery cases 3 are joined up, the two adjacent joining walls 54a, 54b constitute a partition section 54 that divides each cell 2a to 2j. Cells 2a to 2j are electrically connected in series by arranging electrical connection elements 9 through partition sections 54 of these battery cases 3.

In partition sections 53 of covers 4 and partition sections 54 of battery cases 3, there are respectively formed coolant passages 55, 56 that communicate with the outside. Cooling of cells 2a to 2j is performed by forcibly passing cooling air through these coolant passages 55, 56.

The battery cases 3 of cells 2a to 2j are integrally formed of resin such as PP/PPE alloy. On the outer surfaces (connecting faces) 57 of joining walls 54a, 54b constituting the side walls on the longest side of these battery cases 3, there are arranged a plurality of air current guides (projections) 15 for forming coolant passages 56. In the example shown in FIG. 8 and FIG. 9, in each case six air current guides 15 are provided in projecting fashion extending in the form of strips in the vertical direction of respective outer surfaces 57 of the two joining walls 54a, 54b, including the air current guides 15 at both side ends. These air current guides 15 extend from the bottom face of battery case 3 as far as a position about ¾ of the height of battery case 3; no air current guides 15 are present in about the top ¼ of connecting face 57. In the regions where these air current guides 15 are not present, there are provided a plurality of point-form projections 16 in the form of short cylindrical pillars to ensure proper spacing. The amount of projection of these point-form projections 16 from connecting face 57 is constituted to be equal to that of air current guides 15.

Figure 8:
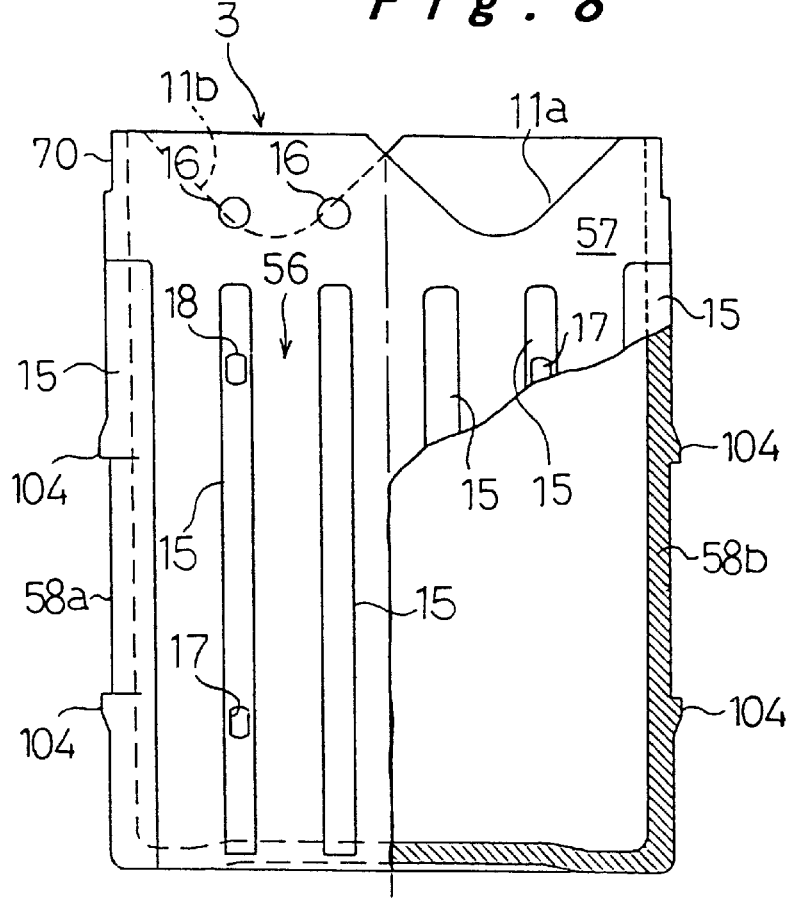
FIG. 8 is a partially sectioned front view showing the battery case.
Figure 9:
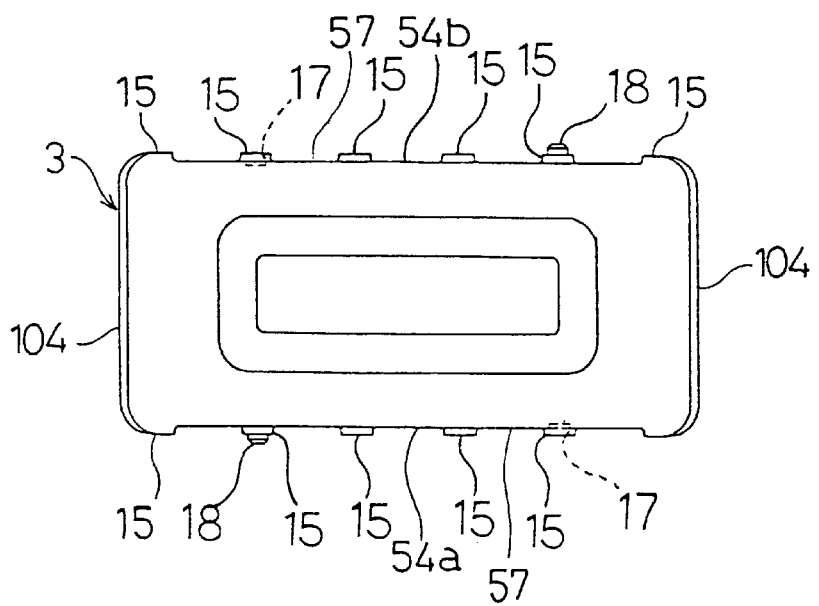
FIG. 9 is a bottom view showing the battery case.
Figure 17:
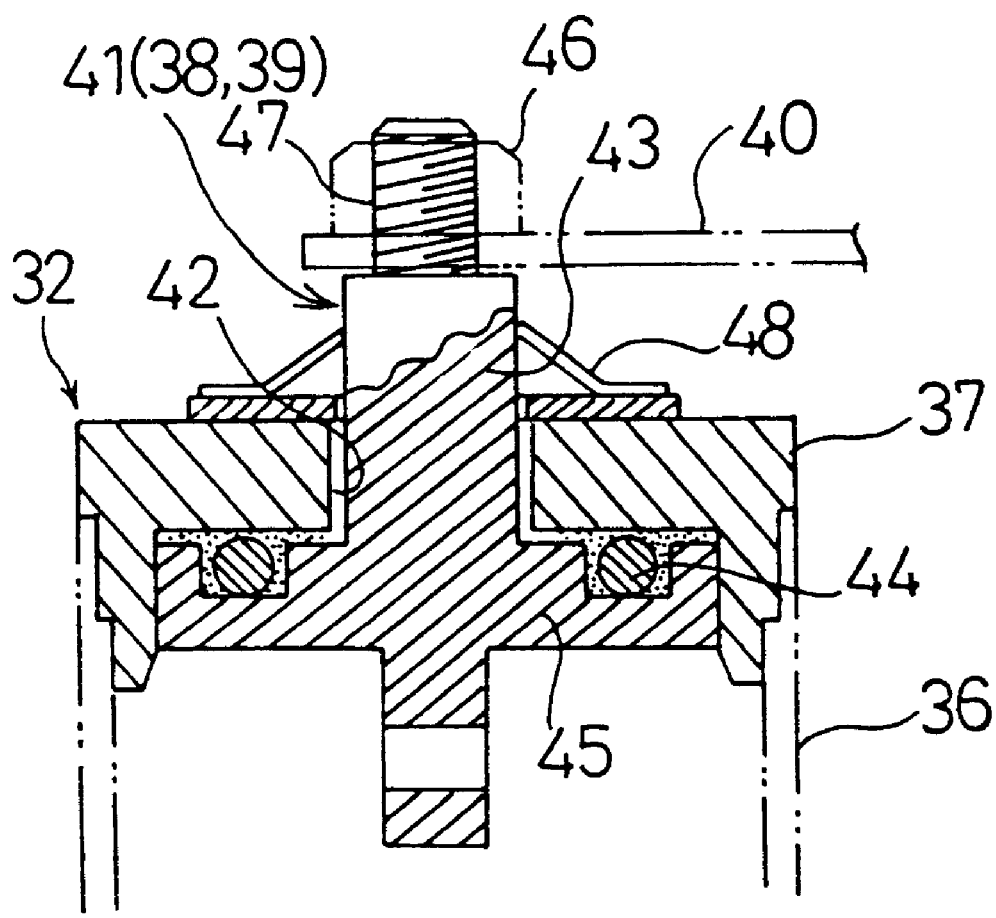
FIG. 17 is a cross-sectional view showing the sealing construction of a prior art terminal post.

In FIG. 8 and FIG. 9, 17 are position-locating recesses and 18 are position-locating projections that fit into position-locating recesses 17; these are provided on prescribed air current guides 15.

Also on the respective outer faces of left and right side walls 58a, 58b constituting the side walls on the shortest sides of battery cases 3, there are provided in projecting fashion in the horizontal direction a pair of upper and lower restraining ribs 104 that restrain movement in the vertical direction of a restraining strap 14.

Furthermore, on the upper sides of the two joining walls 54a, 54b of battery cases 3, there are formed V-shaped recesses 11a, 11b. One recess 11a is arranged offset in one direction in the left/right direction from the center of this upper side, while the other recess 11b is arranged offset in the other direction in the left/right direction from the center of this upper side.

Figure 10:
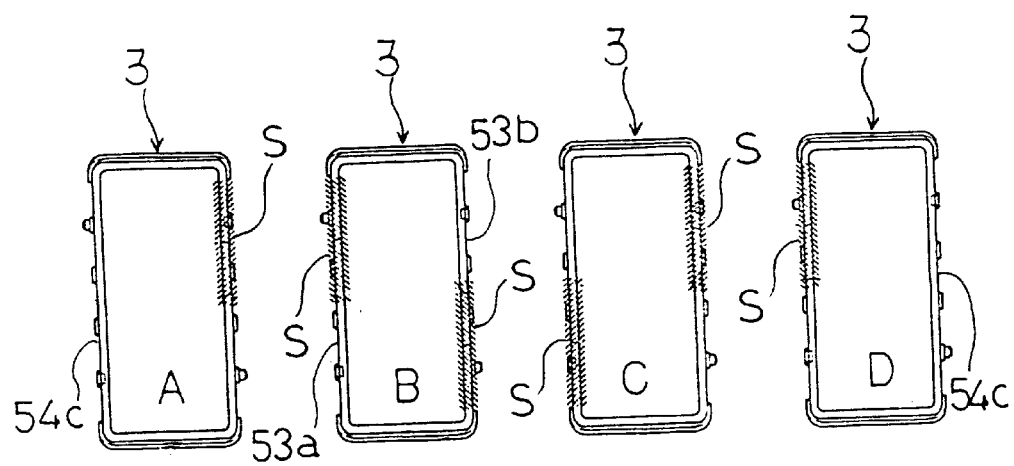
FIG. 10 is a plan view showing various types of battery case.

In the example described above, recesses 11a, 11b were provided on respectively both joining walls 54a, 54b of battery cases 3, but recesses 11a, 11b are unnecessary, and in fact might be detrimental on the side walls 54c on the outside of battery cases 3 of cells 2a, 2j positioned at both ends. Accordingly, as shown in FIG. 10, four types of battery case 3 were manufactured, taking into account the necessity for recesses 11a, 11b and left/right symmetry. In FIG. 10, the battery case indicated by A for use in cell 2a is a battery case 3 that is not provided with a recess S (indicated in FIG. 10 by hatching) on the outside side wall 54c. The battery case indicated by B is a battery case 3 for cells 2b, 2d, 2f, 2h, as described with reference to FIG. 8 and FIG. 9. The battery case indicated by C is an battery case 3 for cells 2c, 2e, 2g, 2i, having a recess S in a position symmetric with the recess of B. The battery case indicated by D is a battery case for cell 2j, wherein these are provided in positions symmetric with the recess of A and the outside side wall 54c.

Figure 4:
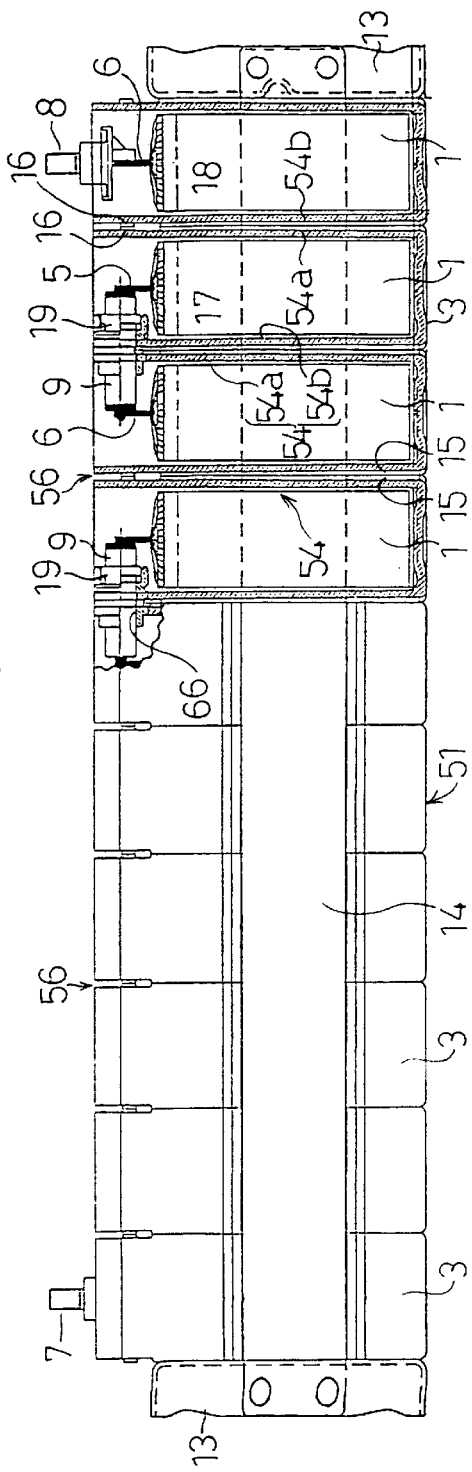
FIG. 4 is a partially sectioned front view showing the unitary battery case.
Figure 11:
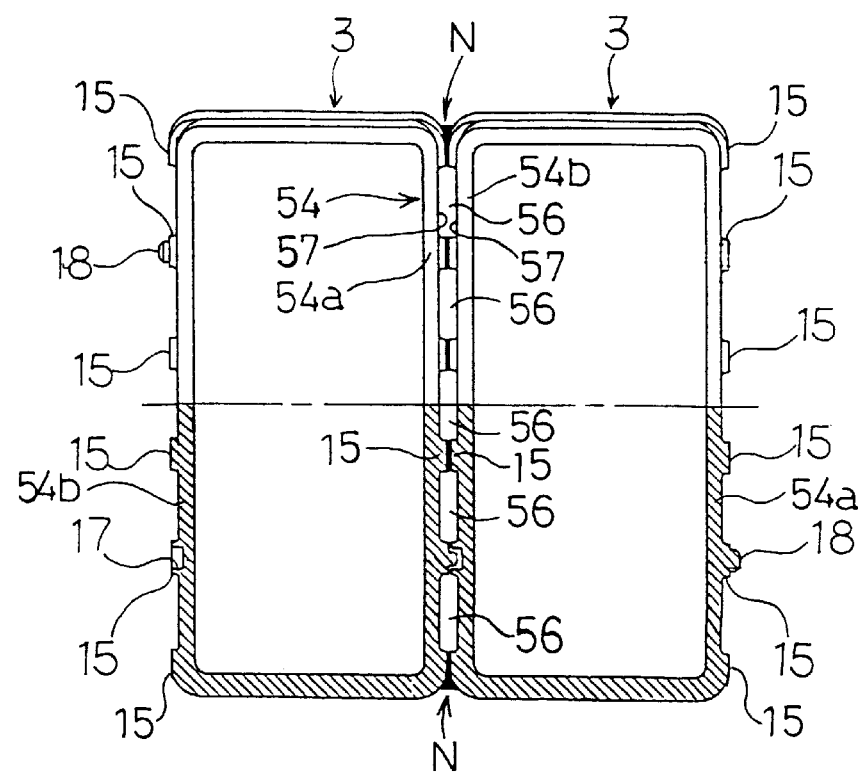
FIG. 11 is a partially sectioned plan view showing the joined condition between the battery cases.

Ten battery cases 3 are mutually joined by welding to form a unitary battery case 51. That is, as shown in FIG. 11 and FIG. 4, in a condition with air current guides 15 and point-form projections 16 of joining walls 54a, 54b of adjacent battery cases 3 abutting each other, and with position-locating projections 18 located by fitting into position-locating recesses 17, battery cases 3 are joined up along the boundary lines N of two joining walls 54a, 54b (specifically, the line of connection of air current guides 15 formed at the two side end parts), by heating the portions in the vicinity of this line from outside so that the resin is melted, then solidifying the resin. Also at this point the recesses 11a, 11b of the two joining walls 54a, 54b that are in joining relationship are in overlapping positions.

Coolant passages 56 that guide the air (coolant) in the upwards direction are formed by the two joining walls 54a, 54b, specifically, by air current guides 15, 15 provided on partition section 54, when these are in joining relationship. Also, in the approximately ¼ top portion of partition sections 54, by effecting contact of point-form projections 16, 16 in an abutting condition, a space whereby air can be guided vertically and to left and right is formed between battery cases 3. Consequently, air flow that is guided upwards by air current guides 15 is guided towards covers 4 (upwards) and can be made to flow out at the sides of battery cases 3 in the left/right direction.

In this embodiment, projections such as air current guides 15 are provided on connecting faces 57 of each battery case 3 and coolant passages 56 are formed by bringing fellow projections into contact when joining. The reason for this is that the amount of projection of air current guides 15 or point-form projections 16 from connecting face 57 can be made very small (for example of the order of 1 mm) and as a result the width of coolant passage 56 in the cell connection direction can be made small (for example of the order of 2 mm); this is therefore advantageous in achieving compactness of the sealed secondary battery assembly.

For the joining of battery cases 3, apart from welding, adhesive could be employed. Also, adhesive joining or welding could be applied to all the contacting portions of the two connection faces 57.

Electricity-generating elements 1 are accommodated in battery cases 3 as shown in FIG. 4. In electricity-generating element 1 constituted by stacking a plurality of positive electrode plates and negative electrode plates with intervening separators and filling with electrolyte, a positive electrode terminal 5 at which are collected the leads from each positive electrode plate and a negative electrode terminal 6 at which are collected the leads from each negative electrode plate are formed. Positive electrode terminal 5 is offset in one direction in the left/right direction and negative electrode terminal 6 is arranged in a position offset in the other direction in the left/right direction.

Positive electrode terminal post 7 is connected to positive electrode terminal 5 of cell 2a positioned at one end, while negative electrode terminal post 8 is connected to negative electrode terminal 6 of cell 2j positioned at the other end. This positive electrode terminal post 7 and negative electrode terminal post 8 constitute the positive electrode and negative electrode terminals of the sealed secondary battery assembly as a whole.

Figure 12:
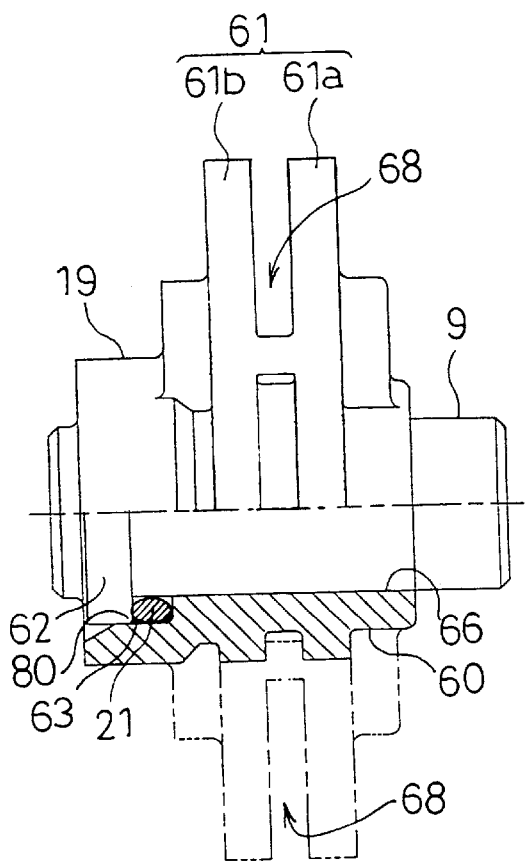
FIG. 12 is a partially sectioned plan view showing an electrical connection element and a support element thereof.
Figure 13:
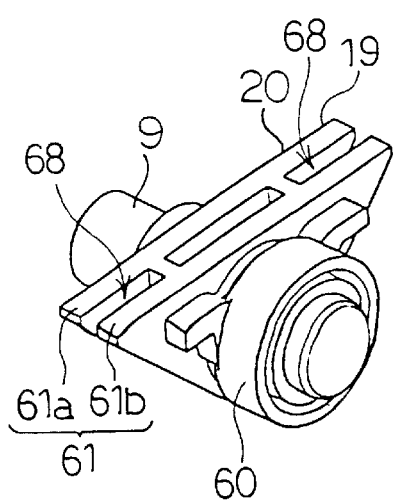
FIG. 13 is a perspective view showing the electrical connection element and support element.
Figure 14:
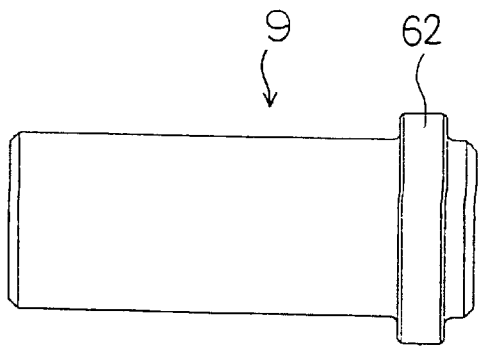
FIG. 14 is a front view showing the electrical connection element.

The pair of joining walls 54a, 54b that are in joining relationship constitute a partition section 54 that defines the space for each cell in unitary battery case 51. A metallic rod (electrical connection element) 9 made of nickel that passes through this partition section 54 in the horizontal direction is fixed to a support element 19 integrally formed of resin such as PP/PPE alloy. This support element 19 comprises a holding tube 60 and a triangular flange 61 whose upper side is horizontal. As shown in FIG. 12 and 13, metallic rod 9 is pressed into and passes through holding tube 60 and is thereby held. Flange 61 fits into the recesses (support element mounting passage sections) 11a, 11b provided in the upper side of connecting walls 54a, 54b. The internal diameter of through-hole 66 of holding tube 60 is formed somewhat smaller than the external diameter of metallic rod 9. Also the aperture 80 at one end of holding tube 60 is formed so as to have an internal diameter larger than that of the other portions. Flange 61 is provided with two vanes 61a, 61b, an air flow space 68 being provided formed between the two vanes 61a, 61b on the left and right of flange 61. This air flow space 68 is beneficial in making the flow of cooling air smooth. The two vanes 61a, 61b contact the respective recesses 11a, 11b of joining walls 54a, 54b in one-to-one correspondence.

Metallic rod 9 is formed as a cylinder having a head 62 that is pressed into holding tube 60. This metallic rod 9 is pressed into through-hole 66 of support element 19. By applying ultrasonic vibration to metallic rod 9 during this pressing-in, the resin of support element 19 is melted around metallic rod 9 by frictional heating produced by this vibration. By this means, the pressing-in operation is made possible and takes place in a smooth fashion; moreover, sealing characteristics are improved by the solidification of the molten resin. An O-ring 21 is arranged in the aperture (holding groove) 80; during the pressing-in, this is compressed by head 62 of metallic rod 9. This compressed O-ring 21 is in pressure contact with the circumference of metallic rod 9, thereby contributing to improvement in sealing. Also, soft sticky sealant 63 is applied to the inner circumferential surface of aperture 80 and metallic rod 9 and O-ring 21, thereby further improving sealing.

In this embodiment, the pressing-in operation was performed while applying ultrasonic vibration to metallic rod 9, but the pressing-in operation could be performed while heating metallic rod 9, or while applying both heat and ultrasonic vibration to metallic rod 9. Furthermore, metallic rod 9 could simply be inserted into support element 19 simply by a pressing-in operation only.

Figure 15:
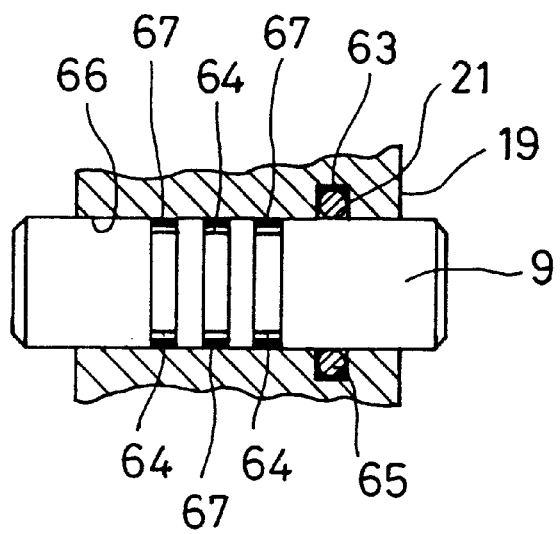
FIG. 15 is a cross-sectional view showing a modified example of the electrical connection element and support element thereof.
Figure 16:
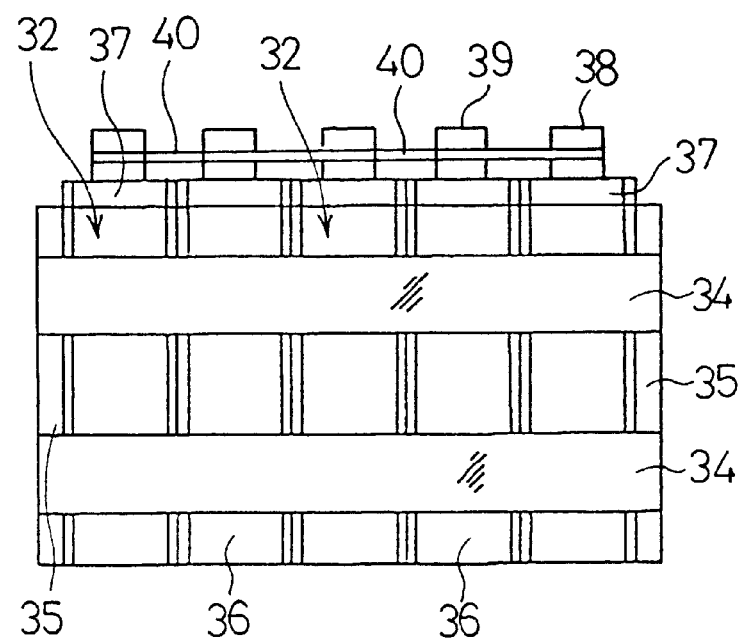
FIG. 16 is a front view showing a prior art example.

Also, as shown in FIG. 15, it is possible to adopt an arrangement in which a plurality of grooves 64 are provided around the circumference of metallic rod 9 and a holding groove 65 is formed that holds O-ring 21, metallic rod 9 being pressed in into through-hole 66 of supporting element 19, while applying ultrasonic vibration, heating or both of these. Soft sticky sealant 63 is applied to holding groove 65 and grooves 64. By such an arrangement, a portion 67 of the resin of support element 19 is melted out into grooves 64 and by subsequent solidification movement in the axial direction of metallic rod 9 is restrained, so that fixing of the metallic rod 9 into support element 19 can be performed in a reliable fashion.

Figure 3:
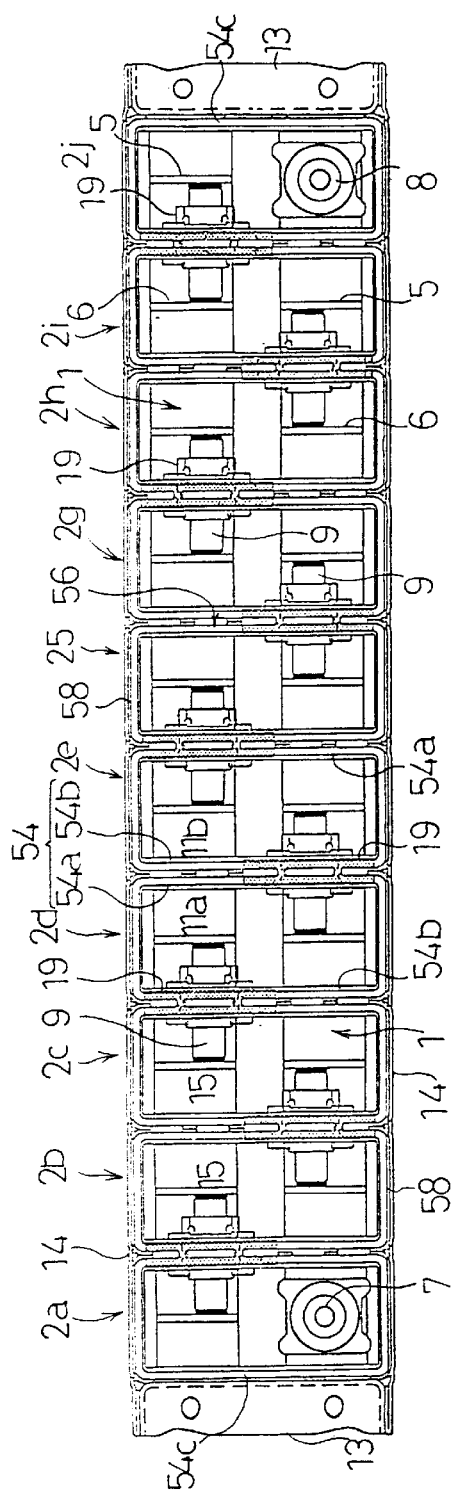
FIG. 3 is a plan view showing the unitary battery case.
Figure 7:
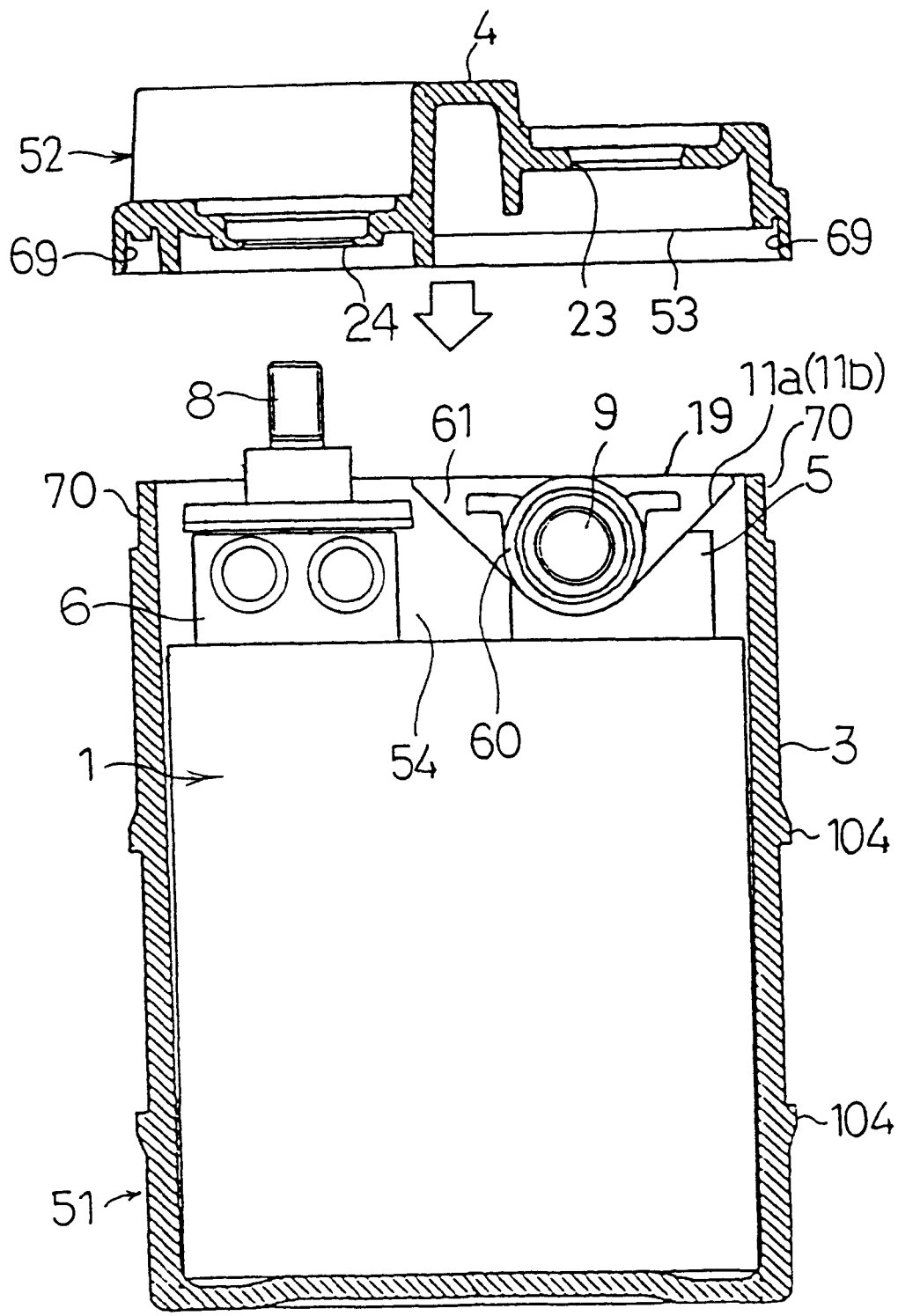
FIG. 7 is a cross-sectional view showing the relationship between a cover and a battery case.

In this way, as shown in FIG. 3, FIG. 4 and FIG. 7, support element 19 with the metallic rod (electrical connection element) 9 fixed thereto is fitted in by respectively bringing the pair of vanes 61a, 61b into contact with the pair of recesses 11a, 11b provided in partition section 54 i.e. the pair of joining walls 54a, 54b, and is joined to joining walls 54a, 54b by welding using a heat welder. If support element 19 and battery cases 3 are formed of the same type of resin, for example PP/PPE alloy, the above welding operation can be performed smoothly and reliably. Also, as shown in FIG. 7, the upper side of support element 19 and the upper side of partition section 54 may be constituted in a coplanar condition.

Figure 2:
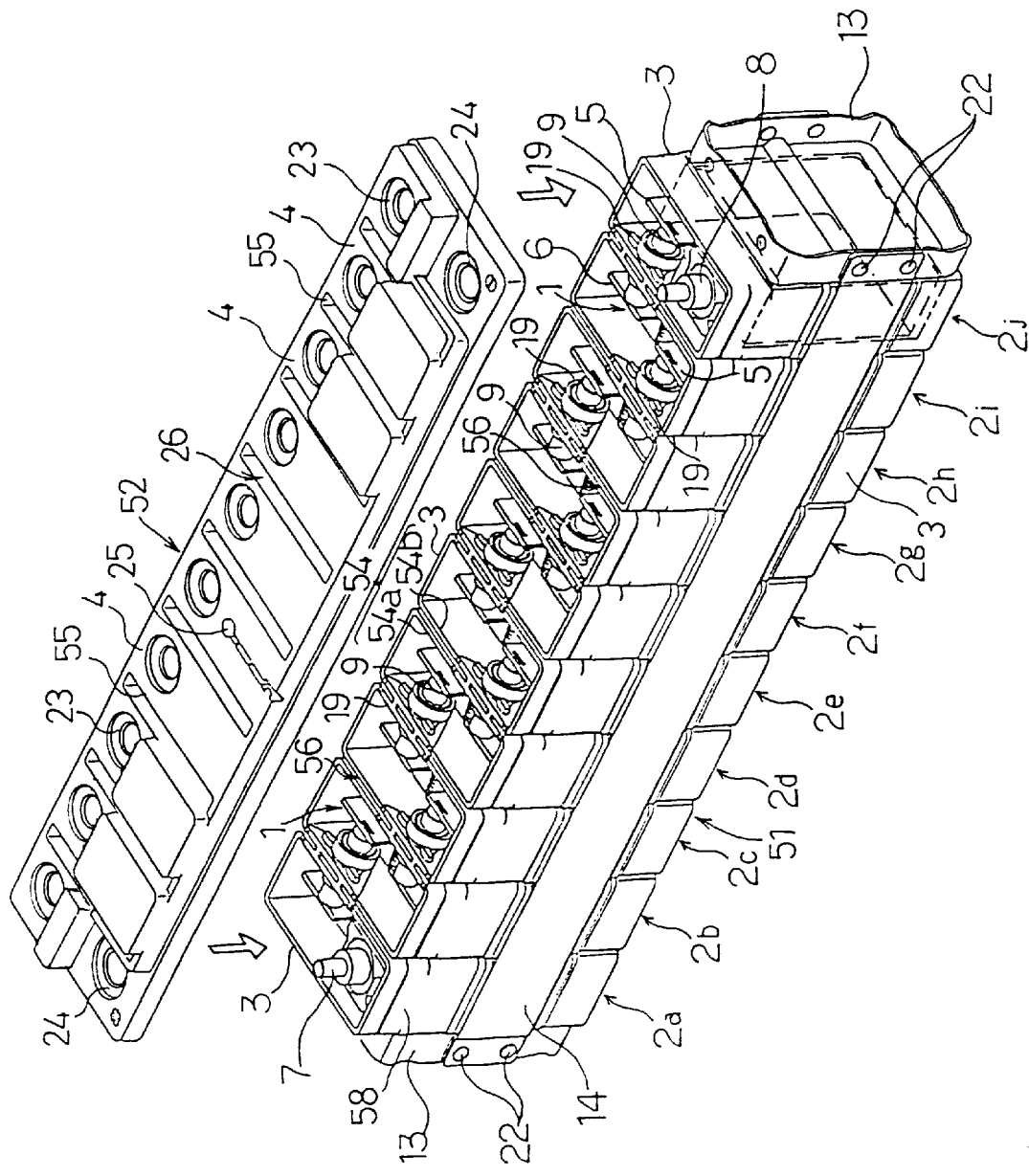
FIG. 2 is a perspective view showing the above embodiment with a unitary cover and unitary battery case in separated condition.
Figure 5:
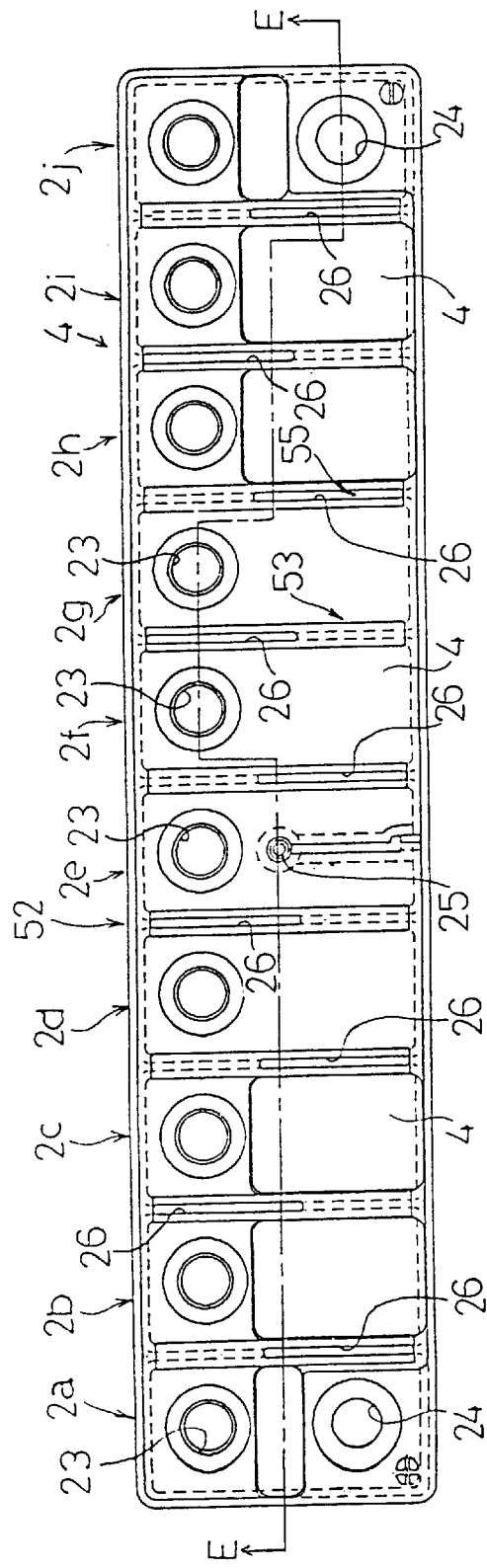
FIG. 5 is a plan view showing the unitary cover.
Figure 6:
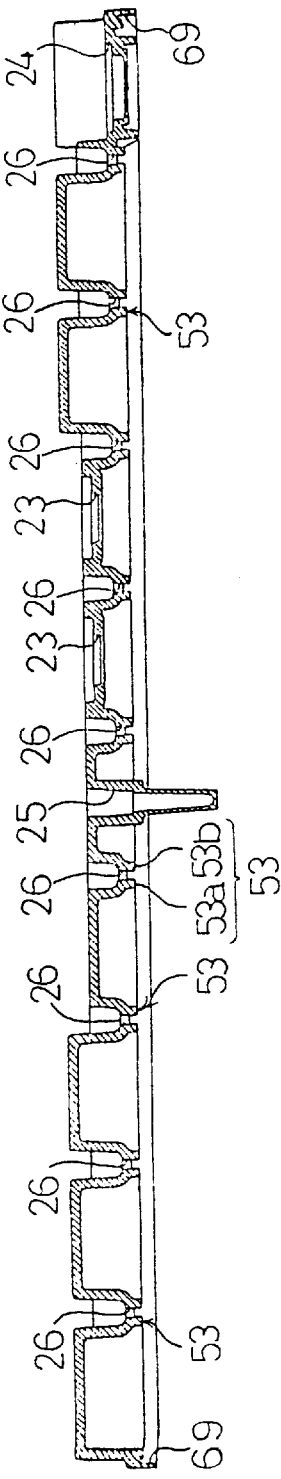
FIG. 6 is a cross-sectional view along the line E—E of FIG. showing the unitary cover.

As shown in FIG. 2, FIG. 5, and FIG. 6, unitary cover 52 is integrally formed using as raw material resin such as PP/PPE alloy, and is provided with partition sections 53 for independently partitioning its internal space into individual cells 2a to 2j. As shown in FIG. 6, these partition sections 53 comprise two partitions 53a, 53b and are formed with an aperture 26 for releasing coolant air therein to the outside. As shown in FIG. 5, these apertures 26 are arranged alternately on the left and right of the center line in the direction of connection of the cells. Also the undersides of the two partitions 53a, 53b contact in one-to-one correspondence the upper side of the two joining walls 54a, 54b of partition section 54 of the battery case and the upper sides of the two vanes 61a, 61b of support element 19.

In unitary cover 52, there are provided terminal post fixing holes 24 for inserting and fixing positive electrode terminal posts 7 and negative electrode terminal posts 8, a safety valve mounting hole 23 for mounting a safety valve 28 (see FIG. 1) and a thermistor mounting section 25 for mounting a thermistor for temperature measurement.

As shown in FIG. 7, a step 69 for fitting purposes is formed in expanded form at the outer periphery of the bottom edge of unitary cover 52. Unitary cover 52 is assembled on to unitary battery case 51 with this superimposed on a fitting step 70 provided at the upper edge of each individual battery case 3. Unitary cover 52 and unitary battery case 51 are joined by welding or adhesion etc.

By joining up and unifying unitary cover 52 and unitary battery case 51, the two partition sections 53, 54 are brought into contact and the cells 2a to 2j come to have respectively independent spaces. Also in the two partition sections 53, 54, coolant passages 55, 56 that communicate with each other and also communicate with the outside are formed. Specifically, when for example cooling air is forcibly made to flow upwards from the bottom face of unitary battery case 51, this air current flows upwards guided by air current guides 15 until, at the top of battery case 3, at the location where point-form projections 16 are provided, part of it flows out sideways while the rest flows out upwards from apertures 26 provided in unitary cover 52. By means of such an air flow, the individual battery cases 3 constituting unitary battery case 51 can be effectively cooled. It should be noted that, in order to make the flow of this air smooth, as shown in FIG. 2, the apertures 26 provided in unitary cover 52 are arranged alternately to left and right with respect to the center line in the direction of connection of the cells, and support elements 19 in which are fixed the electrical connection elements (metallic rods) 9 are arranged alternately to left and right with respect to the center line and in symmetric positions of apertures 26.

Since unitary battery case 51 is joined by welding individually manufactured battery cases 3, there are some problems in relation to its tensile strength. In order to overcome this problem, end plates 13 are arranged on both outside ends of unitary battery case 51 and the ends of a pair of left and right restraining straps 14 are coupled by rivets 22 to these end plates 13 thereby binding unitary battery case 51 tightly.

Apart from the embodiment described above, the present invention could be constituted in various modes. For example, the unitary case could be constituted by a unitary resin molding. Alternatively, instead of a unitary case, the individual cells could be integrally coupled by restraining them by the end plates and restraining straps without using adhesive or welding means. Also, the unitary cover could be constituted by joining separately manufactured cover elements. Furthermore, the electrical connection elements could be fixed to the support elements by insert molding, or support elements to which the electrical connection elements are fixed could be joined to the partition sections of the unitary cover.

INDUSTRIAL APPLICABILITY

With the present invention, high sealing performance around the electrical connection elements, compactness and high stability can be achieved, so it is useful as a sealed secondary battery assembly.

What is claimed is:

1. A sealed secondary battery assembly in which electricity-generating elements are accommodated in cases made of resin formed in rectangular tubular shape having a bottom, a plurality of cells constituted by sealing apertures of the cases by covers made of resin are arranged in series, these cells being electrically connected by electrical connection elements, wherein the cases (3) of the individual cells are integrally coupled and the covers (4) of the individual cells are constituted by a unitary cover, and support elements made of resin in which are fixed electrical connection elements are joined to support element mounting passage sections provided on partition sections that define the space for the cells said electrical connection elements being thereby arranged so as to pass through said partition sections.

2. The sealed secondary battery assembly according to claim 1, wherein the cases of the individual cells are restrained using end plates and restraining straps, these cases thus being integrally coupled.

3. The sealed secondary battery assembly according to claim 1, wherein the cases of the individual cells are individually manufactured and these cases are joined to constitute a unitary case.

4. The sealed secondary battery assembly according to claim 3, wherein respective recesses are formed on the upper side of joining walls of the cases of the cells, these joining walls constituting the support element mounting passage sections of the partition sections, the support elements being formed in a shape fitted spanning two adjacent recesses, the two being joined in a condition with a support element fitted on to support element mounting passage sections.

5. The sealed secondary battery assembly according to claim 4, wherein the upper side of the support element and the upper side of the partition section of the case are in coplanar condition.

6. The sealed secondary battery assembly according to claim 1, wherein the unitary case is constituted by a unitary molding.

7. The sealed secondary battery assembly according to claim 1, wherein the unitary cover is constituted by a unitary molding.

8. The sealed secondary battery assembly according to claim 1, wherein the support element mounting passage sections are constituted by forming recesses in the upper side of the partition section of the coupled cases, these are formed in a condition in which support elements fit into said recesses, and the two are joined in a condition with a support element fitting on to support body mounting passage sections.

9. The sealed secondary battery assembly according to claim 8, wherein the upper side of the support element and the upper side of the partition section of the case are in coplanar condition.

10. The sealed secondary battery assembly according to claim 1, wherein the cases, the unitary cover and the support elements consist of the same type of resin.

11. The sealed secondary battery assembly according to claim 1, wherein the electrical connection element is a metallic rod and the support element is provided with a through-hole for pressing in the metallic rod, and, by pressing in the metallic rod into the support element, the metallic rod is fixed in the support element.

12. The sealed secondary battery assembly according to claim 11, wherein, during pressing in, ultrasonic vibration, heating or both of these is applied to the metallic rod.

13. The sealed secondary battery assembly according to claim 12 of a construction wherein a groove is provided around the circumference of the metallic rod, and, when the metallic rod is pressed into the through-hole of the support element, some of the resin of the support element is melted out into said groove by ultrasonic vibration, heating or both of these, and is then solidified.

14. The sealed secondary battery assembly according to claim 11, wherein a holding groove is provided circumferentially on the inside face of the through-hole of the support element, an O-ring that makes pressure contact with the circumference of the metallic rod being held in this holding groove.

15. The sealed secondary battery assembly according to claim 14, wherein soft sticky sealant is applied to the holding groove.

16. The sealed secondary battery assembly according to claim 1, wherein the electrical connection element has at least its surface made of nickel.

17. The sealed secondary battery assembly according to claim 1, wherein the support element mounting passage section is constituted by forming a recess in the underside of the partition section of the unitary cover, the support element is formed in a shape fitting into said recess, and the two are joined in a condition with the support element fitting into the support element mounting passage section.

18. The sealed secondary battery assembly according to claim 1, wherein the electrical connection element is a metallic rod and the metallic rod is coupled with the support element by means of insert molding.

* * * * *